United States Patent
Kosaka et al.

(10) Patent No.: US 11,127,300 B2
(45) Date of Patent: Sep. 21, 2021

(54) VEHICLE RECOGNITION DEVICE AND VEHICLE RECOGNITION METHOD

(71) Applicants: DENSO CORPORATION, Kariya (JP); TOYOTA JIDOSHA KABUSHIKI KAISHA, Toyota (JP)

(72) Inventors: Kengo Kosaka, Kariya (JP); Yohei Masui, Kariya (JP); Takashi Maeda, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 27 days.

(21) Appl. No.: 16/342,027

(22) PCT Filed: Oct. 10, 2017

(86) PCT No.: PCT/JP2017/036716
§ 371 (c)(1),
(2) Date: Apr. 15, 2019

(87) PCT Pub. No.: WO2018/074288
PCT Pub. Date: Apr. 26, 2018

(65) Prior Publication Data
US 2019/0251845 A1    Aug. 15, 2019

(30) Foreign Application Priority Data
Oct. 17, 2016   (JP) .............................. JP2016-203838

(51) Int. Cl.
*G06K 9/00*   (2006.01)
*G01C 22/00*  (2006.01)
(Continued)

(52) U.S. Cl.
CPC ............. *G08G 1/167* (2013.01); *B60R 21/00* (2013.01); *B60W 40/06* (2013.01);
(Continued)

(58) Field of Classification Search
USPC ....... 382/100, 103–107, 162, 172, 173, 181, 382/199, 209, 219, 224, 232, 254, 274,
(Continued)

(56) References Cited

U.S. PATENT DOCUMENTS

2007/0069874 A1   3/2007  Huang et al.
2015/0070501 A1*  3/2015  Ooi .................... G08G 1/09626
                                                          348/148
(Continued)

FOREIGN PATENT DOCUMENTS

CN    101296833 A    10/2008
CN    101776438 A     7/2010
(Continued)

OTHER PUBLICATIONS

Peng, Xu Mao; Research and realization of lane boundary detection system; China Excellent Master's Thesis Full Text Database Information Science and Technology Collection; Tongfang Knowledge Network Technology Co., Ltd. ISSN 1674-0246 CN 11-9144jG; Feb. 16-Mar. 15, 2016; 6 pgs.

*Primary Examiner* — Seyed H Azarian
(74) *Attorney, Agent, or Firm* — Maschoff Brennan (57) ABSTRACT

A vehicle recognition device includes: an acquisition section acquiring image information based on an image captured by a vehicle-mounted camera; a boundary line detection section detecting, based on the image information, boundary lines on both left and right sides demarcating vehicle traveling lanes; a vehicle detection section detecting position information on an object vehicle; and a recognition section recognizing lane-to-lane movement of the object vehicle between an own lane in which the subject vehicle is traveling and an adjacent lane. The recognition section recognizes the lane-to-lane movement based on a second boundary line of the boundary lines, a lane width between a first boundary line of the boundary lines and the second bound-
(Continued)

ary line, and the position information on the object vehicle, the first boundary line dividing the own lane and the adjacent lane, the second boundary line being different from the first boundary line.

6 Claims, 6 Drawing Sheets (51) Int. Cl.
*G08G 1/16* (2006.01)
*G06T 7/70* (2017.01)
*G06T 7/20* (2017.01)
*G06K 9/03* (2006.01)
*G06T 7/60* (2017.01)
*G05D 1/02* (2020.01)
*B60R 21/00* (2006.01)
*B60W 40/06* (2012.01)
*G06T 1/00* (2006.01)
*G06T 7/00* (2017.01)
*B60W 40/02* (2006.01)

(52) U.S. Cl.
CPC ......... *G05D 1/0223* (2013.01); *G05D 1/0246* (2013.01); *G06K 9/00798* (2013.01); *G06K 9/036* (2013.01); *G06T 1/00* (2013.01); *G06T 7/00* (2013.01); *G06T 7/20* (2013.01); *G06T 7/60* (2013.01); *G06T 7/70* (2017.01); *G08G 1/16* (2013.01); *G08G 1/166* (2013.01); *B60W 40/02* (2013.01); *B60W 2420/42* (2013.01); *B60W 2554/00* (2020.02); *G05D 2201/0213* (2013.01); *G06K 2209/23* (2013.01); *G06T 2207/30236* (2013.01); *G06T 2207/30256* (2013.01)

(58) Field of Classification Search
USPC ................ 382/276, 286–291, 305, 312, 321; 348/148; 701/1, 23, 36
See application file for complete search history.

(56) References Cited

U.S. PATENT DOCUMENTS

| 2015/0336577 | A1* | 11/2015 | Kosaka | ................ | B60W 30/09 701/1 |
| 2016/0012300 | A1* | 1/2016 | Tsuruta | ................ | G06K 9/6215 382/104 |
| 2016/0188983 | A1* | 6/2016 | Suzuki | ............... | G06K 9/00798 382/104 |
| 2018/0029604 | A1* | 2/2018 | Niino | .................... | B60W 10/20 |

FOREIGN PATENT DOCUMENTS

| JP | H08-5388 A | 1/1996 |
| JP | H09-223235 A | 8/1997 |
| JP | 2016-134092 A | 7/2016 |

* cited by examiner

VEHICLE RECOGNITION DEVICE AND VEHICLE RECOGNITION METHOD

CROSS-REFERENCE TO RELATED APPLICATIONS

This application is a national stage application of PCT Application No. PCT/JP2017/036716, filed on Oct. 10, 2017, which claims priority to Japanese Patent Application No. 2016-203838 filed on Oct. 17, 2016, the contents of which are incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to a vehicle recognition device and a vehicle recognition method for recognizing that a vehicle moves between an own lane and an adjacent lane.

BACKGROUND ART

Conventionally, there has been a vehicle recognition device capable of estimating movement of a preceding vehicle and recognizing entry of the preceding vehicle into an own lane (e.g., Patent Literature 1). The vehicle recognition device detects an angle (inclination angle) between a direction of travel of an adjacent preceding vehicle and a boundary line, and determines in advance on the basis of a size of the angle whether the preceding vehicle is attempting to enter the own lane.

CITATION LIST

Patent Literature

[PTL 1] JP H09-223235 A

SUMMARY OF THE INVENTION

However, a boundary line dividing an own lane in which the subject vehicle is traveling and an adjacent lane in which an object vehicle is traveling is not necessarily always properly detectable. For example, the boundary line may be blurred and discontinuous, or an adjacent vehicle may hinder a vehicle-mounted camera mounted on the subject vehicle from capturing an image and this may prevent proper detection of the boundary line. Thus, when the boundary line dividing the own lane and the adjacent lane cannot be properly detected, the vehicle recognition device described in Patent Literature 1 cannot identify an angle between of a direction of travel of the preceding vehicle and the boundary line, and thus cannot perform determination regarding entry of the preceding vehicle into the own lane.

The present disclosure has been made in light of the above circumstances, and has a main object of providing a vehicle recognition device and a vehicle recognition method capable of recognizing that a vehicle moves between an own lane and an adjacent lane, even when a boundary line dividing the own lane and the adjacent lane cannot be properly detected.

In order to solve the problem, the present disclosure is configured as below.

A vehicle recognition device of the present disclosure includes: an acquisition section that acquires image information based on an image captured by a vehicle-mounted camera; a boundary line detection section that detects, on the basis of the image information, boundary lines on both left and right sides demarcating vehicle traveling lanes; a vehicle detection section that detects position information on an object vehicle; and a recognition section that recognizes lane-to-lane movement of the object vehicle between an own lane in which the subject vehicle is traveling and an adjacent lane, wherein: the recognition section recognizes the lane-to-lane movement on the basis of a second boundary line of the boundary lines detected by the boundary line detection section, a lane width between a first boundary line of the boundary lines and the second boundary line, and the position information on the object vehicle, the first boundary line dividing the own lane and the adjacent lane, the second boundary line being different from the first boundary line.

The first boundary line dividing the own lane and the adjacent lane cannot be detected on the basis of the image information, for example, when some obstacle prevents an image of the first boundary line from being captured or when the first boundary line is blurred. Thus, the recognition section recognizes that the object vehicle moves between the own lane in which the subject vehicle is traveling and the adjacent lane, on the basis of the second boundary line different from the first boundary line, the lane width between the first boundary line and the second boundary line, and the position information on the object vehicle. Therefore, even when the first boundary line dividing the own lane and the adjacent lane is not properly detected, it is possible to recognize that the object vehicle moves laterally, for example, the object vehicle is changing lanes.

BRIEF DESCRIPTION OF THE DRAWINGS

The above object and other objects, features, and advantages of the present disclosure will be clarified by the following detailed description with reference to the accompanying drawings, wherein:

FIG. 3 (A) and (B) are schematic diagrams showing a difference in undetected portion;

DESCRIPTION OF THE EMBODIMENTS

Embodiments of the present disclosure will be described below with reference to the drawings. In the following embodiments, the same or equivalent portions are given the same reference numerals in the drawings.

A vehicle control device for controlling a vehicle is mounted on the vehicle. The vehicle control device has an ACC (Adaptive Cruise Control) function, and causes the subject vehicle to travel following a detected object vehicle so that a distance to the detected object vehicle is a target value for an inter-vehicle distance according to a vehicle speed.

Figure 1:
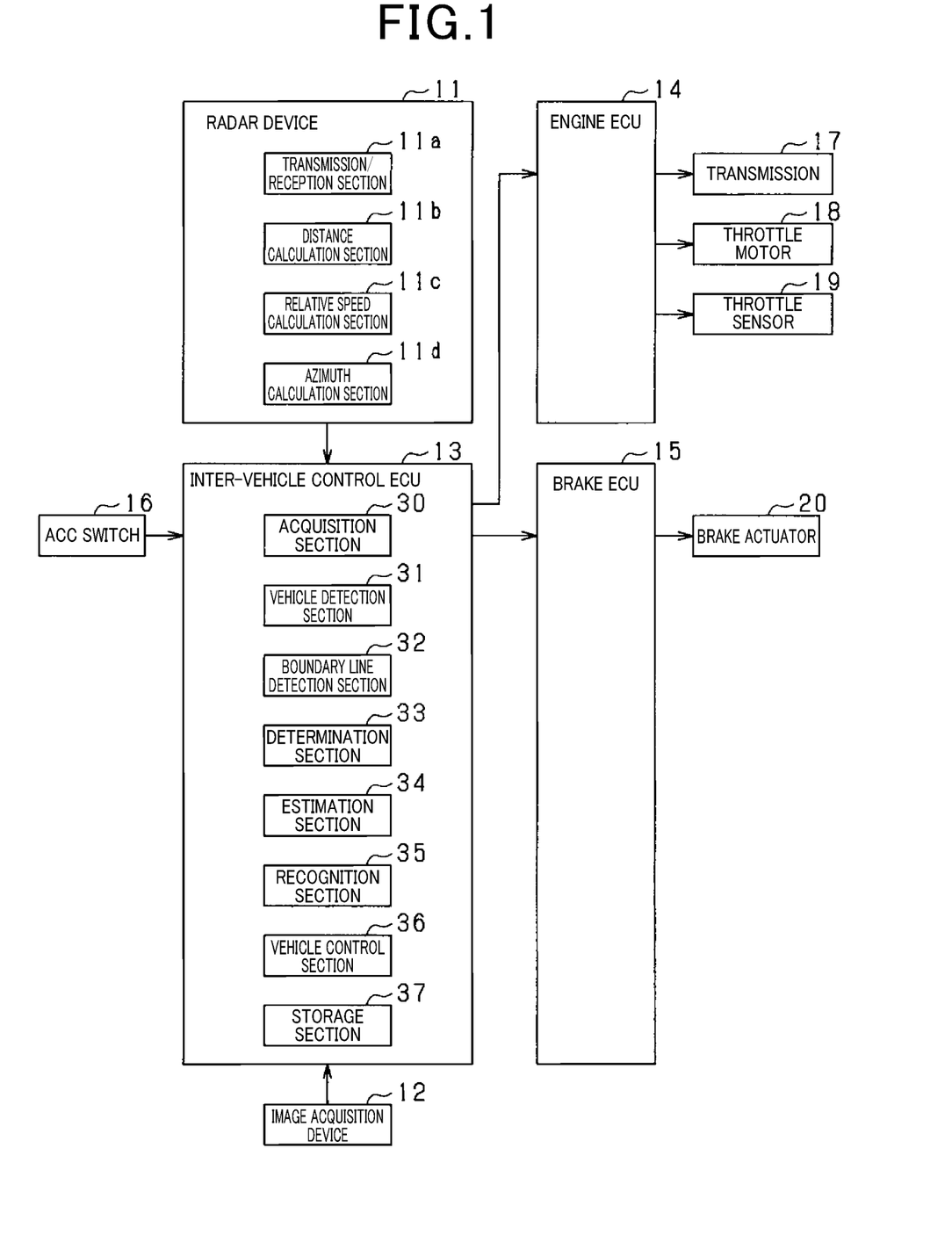
FIG. 1 is a block diagram illustrating a schematic structure of a vehicle control device.

In FIG. 1, an inter-vehicle distance device includes a radar device 11, an image acquisition device 12, an inter-vehicle control ECU 13, an engine ECU 14, and a brake ECU 15. The inter-vehicle control ECU 13 functions as a vehicle recognition device by using information acquired from the radar device 11 and the image acquisition device 12, and performs inter-vehicle distance control (vehicle following control) in cooperation with the engine ECU 14 and the brake ECU 15.

The inter-vehicle control ECU 13 is connected to each of the radar device 11 and the image acquisition device 12 via a vehicle-mounted network so that the inter-vehicle control ECU 13 and each of the radar device 11 and the image acquisition device 12 can communicate with each other. Furthermore, the inter-vehicle control ECU 13 is connected to each of the engine ECU 14 and the brake ECU 15 via a vehicle-mounted network so that the inter-vehicle control ECU 13 and each of the engine ECU 14 and the brake ECU 15 can communicate with each other. The inter-vehicle control ECU 13 is connected to an ACC switch 16 via an exclusive line such as an exclusive line for serial communication. The engine ECU 14 is connected to each of a transmission 17, a throttle motor 18, and a throttle sensor 19 via an exclusive line such as an exclusive line for serial communication. The brake ECU 15 is connected to a brake ACT (actuator) 20 via an exclusive line such as an exclusive line for serial communication.

The radar device 11, the image acquisition device 12, and the ECUs 13 to 15 are each an information processing device including a microcomputer, an interface for a wire harness, and the like. The microcomputer includes a CPU, a ROM, a RAM, an I/O, a CAN communication device, and the like.

The radar device 11 is a device that detects, for each of object vehicles (vehicles other than the subject vehicle), an inter-vehicle distance, a relative speed, an azimuth, and a relative position regarding the object vehicle, and transmits the detected information as radar information to the inter-vehicle control ECU 13. Specifically, the radar device 11 is, for example, a radar device that transmits a high-frequency signal in a millimeter wave band. The radar device 11 sets, as a detection range, a region in a predetermined detection angle ahead of the subject vehicle, and detects a position of an object within the detection range.

Specifically, the radar device 11 performs various functions by a transmission/reception section 11a that transmits search waves and receives reflected waves by a plurality of antennas, a distance calculation section 11b that calculates an inter-vehicle distance to an object vehicle (object), a relative speed calculation section 11c that calculates a relative speed to the object vehicle (object), and an azimuth calculation section 11d that calculates an azimuth of the object vehicle (object) relative to the subject vehicle. The distance calculation section 11b calculates the inter-vehicle distance to the object vehicle on the basis of a transmission time at which the search waves are transmitted and a reception time at which the reflected waves are received. The relative speed calculation section 11c calculates the relative speed on the basis of a frequency, which has changed due to a Doppler effect, of the reflected waves reflected by the object vehicle. The azimuth calculation section 11d calculates the azimuth of the object vehicle on the basis of a phase difference of the reflected waves received by the plurality of antennas.

When the inter-vehicle distance to the object vehicle and the azimuth of the object vehicle are calculated, a position (relative position) of the object vehicle relative to the subject vehicle can be calculated. At predetermined time intervals, the radar device 11 calculates radar information (inter-vehicle distance, relative speed, azimuth, and relative position) and transmits the calculated radar information to the inter-vehicle control ECU 13.

The image acquisition device 12 is a device that captures an image of the surroundings of the subject vehicle, and transmits the captured image as image information to the inter-vehicle control ECU 13. Specifically, the image acquisition device 12 is a vehicle-mounted monocular camera, and is, for example, a CCD camera, a CMOS image sensor, or the like. The image acquisition device 12 is mounted at a predetermined height in a center in a width direction of the vehicle, and captures, from a bird's-eye view, an image of a region extending over a predetermined angular range toward an area ahead of the vehicle. The captured image is transmitted as image information to the inter-vehicle control ECU 13. The vehicle-mounted monocular camera is used as the image acquisition device 12, but a plurality of cameras (compound eye camera) may also be used.

The inter-vehicle control ECU 13 is connected to the ACC switch 16. When the ACC switch 16 is operated, the inter-vehicle control ECU 13 is instructed that the ACC function is turned on or off. When the ACC function is turned on, the inter-vehicle control ECU 13 performs a vehicle following process (described later). By performing the vehicle following process, the inter-vehicle control ECU 13 determines an acceleration instruction value for the subject vehicle on the basis of the information transmitted from the radar device 11 and the image acquisition device 12, a vehicle speed and acceleration of the subject vehicle, and the like, and transmits the acceleration instruction value to the engine ECU 14 and the brake ECU 15.

The engine ECU 14 controls the throttle motor 18 while monitoring a throttle opening degree detected by the throttle sensor 19. For example, on the basis of a table in which a vehicle speed, an acceleration indication value, and a throttle opening degree are associated with each other, the throttle opening degree is determined according to the acceleration instruction value received from the inter-vehicle control ECU 13 and a current vehicle speed. Furthermore, on the basis of the vehicle speed and the throttle opening degree, the engine ECU 14 determines whether a gear needs to be switched, and when necessary, the engine ECU 14 instructs the transmission 17 to switch the gear.

The brake ECU 15 performs braking of the subject vehicle by controlling an open/closed state and opening degree of a valve of the brake ACT 20. The brake ACT 20 controls acceleration (deceleration) of the subject vehicle by increasing, maintaining, or reducing wheel cylinder pressure of each wheel by using hydraulic pressure that a pump has caused a working fluid to generate. The brake ECU 15 performs braking of the subject vehicle according to the acceleration instruction value transmitted from the inter-vehicle control ECU 13.

The inter-vehicle control ECU 13 will be described. The inter-vehicle control ECU 13 performs various functions by an acquisition section 30 that acquires information, a vehicle detection section 31 that detects information regarding an object vehicle, a boundary line detection section 32 that detects a boundary line, a determination section 33 that determines whether the boundary line has been properly detected, an estimation section 34 that estimates the boundary line, a recognition section 35 that recognizes lane-to-lane movement of the object vehicle, and a vehicle control section 36 that controls the vehicle. When a program stored in a storage section 37 of the inter-vehicle control ECU 13 is executed, the various functions are implemented. The various functions may be implemented by an electronic circuit which is hardware. Alternatively, at least part of the various functions may be implemented by software, i.e., a process performed on a computer.

The acquisition section 30 receives (acquires) radar information from the radar device 11 and receives (acquires) image information from the image acquisition device 12.

On the basis of the image information and the radar information acquired by the acquisition section 30, the vehicle detection section 31 detects information regarding an object vehicle such as position information on the object vehicle. At this point, the vehicle detection section 31 improves accuracy of the position information or the like by fusing (fusion) the image information with the radar information.

For example, on the basis of a position or a length in a width direction (lateral direction of the subject vehicle) of a captured image included in the image information, the vehicle detection section 31 identifies a position or a vehicle width of the object vehicle in the width direction. Specifically, on the basis of the captured image, the vehicle detection section 31 identifies characteristic points indicating presence of the object vehicle, and on the basis of the characteristic points, the vehicle detection section 31 identifies the position or the vehicle width of the object vehicle in the width direction. In the present embodiment, around the subject vehicle as a center (origin), the width direction (lateral direction) of the subject vehicle may be termed an x-axis direction, and a direction of travel (longitudinal direction) of the subject vehicle may be termed a y-axis direction.

On the other hand, on the basis of an inter-vehicle distance and an azimuth included in the radar information, the vehicle detection section 31 identifies a position of the object vehicle in the direction of travel (y-axis direction) of the subject vehicle, and on the basis of a relative speed in the radar information, the vehicle detection section 31 identifies a relative speed of the object vehicle. Thus, out of the information transmitted from the radar device 11 and the image acquisition device 12, the information with higher accuracy is used to detect information regarding the object vehicle. This can improve accuracy of the information regarding the object vehicle.

Any method can be used as a method of identifying the characteristic points indicating presence of the object vehicle. Specifically, the characteristic points indicating presence of the object vehicle may be identified by extracting an edge point on the basis of luminance information on the captured image, and performing the Hough Transform with respect to the extracted edge point. For example, the edge point may be extracted by scanning the captured image in a right direction and a left direction, and extracting an up edge point at which a luminance value is increased by a predetermined value or more or extracting a down edge point at which the luminance value is reduced by a predetermined value or less. In the Hough Transform, for example, a point on a straight line on which a plurality of edge points are continuously arranged or a point at which straight lines are orthogonal to each other is extracted as the characteristic points.

The boundary line detection section 32 detects a boundary line on the basis of the image information. Examples of the boundary line include a boundary line, such as a white line, marked with paint on a road surface. In the detection of a boundary line, the boundary line detection section 32 extracts edge points having predetermined edge strength from the captured image included in the image information, and when the extracted edge points are arranged in a continuous line at predetermined intervals, the boundary line detection section 32 detects the line as a boundary line.

Furthermore, when the boundary line detection section 32 detects a plurality of boundary lines, the boundary line detection section 32 identifies, as boundary lines of an own lane in which the subject vehicle is traveling, boundary lines having characteristics of a boundary line of the own lane. For example, out of the detected boundary lines, the boundary line detection section 32 identifies, as the boundary lines demarcating the own lane, left and right boundary lines that are close to the subject vehicle and are arranged to include the subject vehicle.

The determination section 33 determines whether a boundary line has been properly detected. In the present embodiment, the determination section 33 determines whether a boundary line (termed a first boundary line hereinafter) that divides the own lane and an adjacent lane has been properly detected. A state where a boundary line has been properly detected indicates that the boundary line has been detected without being discontinuous in a detection range in the direction of travel (y-axis direction) of the vehicle.

Specifically, the determination section 33 first determines whether there is a possibility that lane-to-lane movement of the object vehicle between the own lane and the adjacent lane is being performed. The lane-to-lane movement includes departure in which the object vehicle moves from the own lane to the adjacent lane and entry in which the object vehicle moves from the adjacent lane to the own lane. That is, the determination section 33 determines whether there is a possibility of departure or entry of the object vehicle from or to the own lane.

Specifically, on the basis of position information on the object vehicle or a speed of the object vehicle, the determination section 33 determines whether there is a possibility of departure or entry of the object vehicle from or to the own lane. For example, when a vehicle departing from the subject vehicle in the x-axis direction is present, the determination section 33 determines that there is a possibility of departure from the own lane. Similarly, when a vehicle approaching the subject vehicle in the x-axis direction is present, the determination section 33 determines that there is a possibility of entry to the own lane.

The determination section 33 may determine that there is a possibility of departure from the own lane, when a vehicle departing from the subject vehicle at a predetermined speed or more in the x-axis direction is present. A speed of an object vehicle in the x-axis direction is calculated from a relative speed and an azimuth of the object vehicle, a speed of the subject vehicle, and the like. Furthermore, the determination section 33 may determine that there is a possibility of departure from the own lane, when a vehicle departing from the subject vehicle in the x-axis direction is present and an inter-vehicle distance in the x-axis direction is a predetermined distance or more. Similarly, the determination section 33 may determine that there is a possibility of entry to the own lane, when a vehicle approaching the subject vehicle at a predetermined speed or more in the x-axis direction is present. Furthermore, the determination section 33 may determine that there is a possibility of entry to the own lane, when a vehicle approaching the subject vehicle in the x-axis direction is present and an inter-vehicle distance in the x-axis direction is within a predetermined distance. Furthermore the determination section 33 may determine that a vehicle with a possibility of departure or entry from or to the own lane is present, when the determination section 33 determines that the object vehicle straddles the boundary line. A state where the object vehicle straddles the boundary line indicates that the vehicle causes the boundary line to be discontinuous (undetected).

Figure 2:
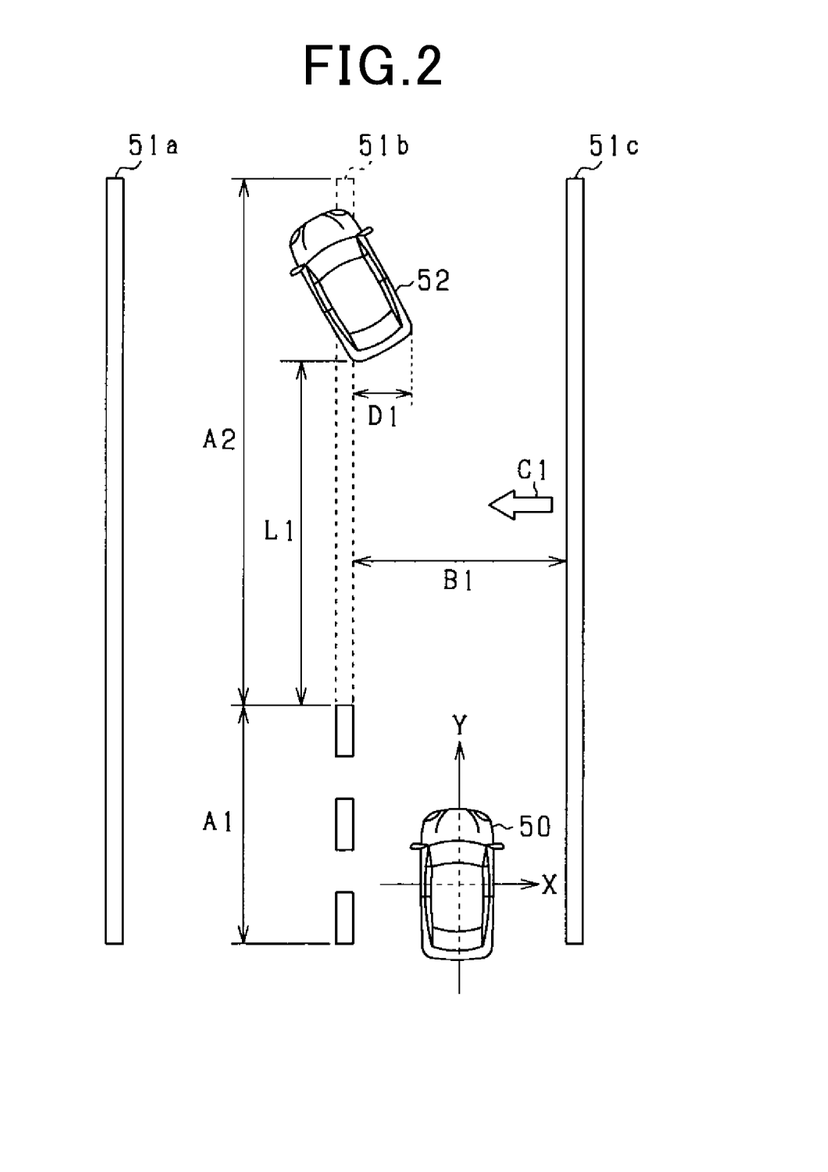
FIG. 2 is a schematic diagram illustrating departure of a vehicle from an own lane.
Figure 3:
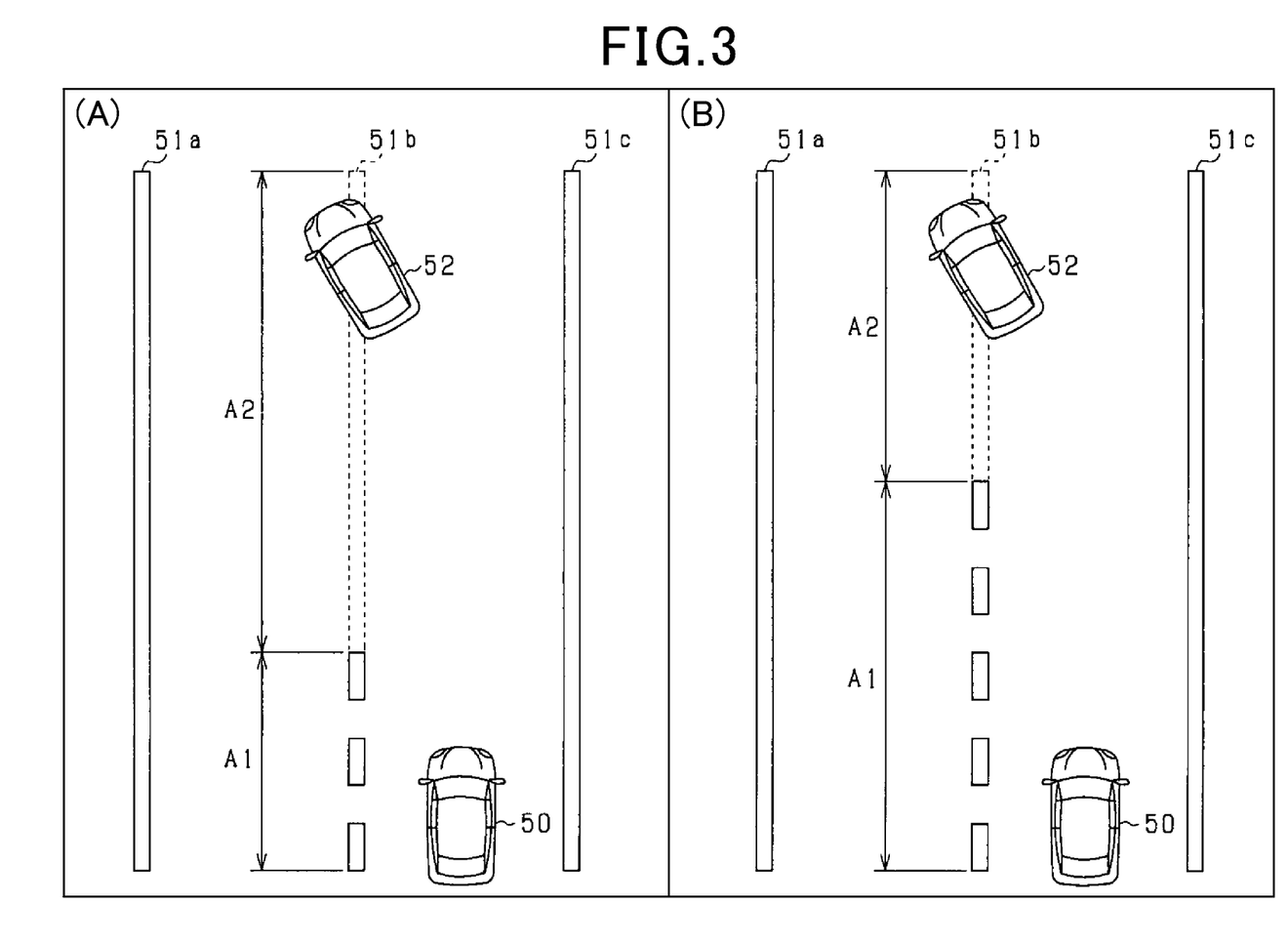
Figure 4:
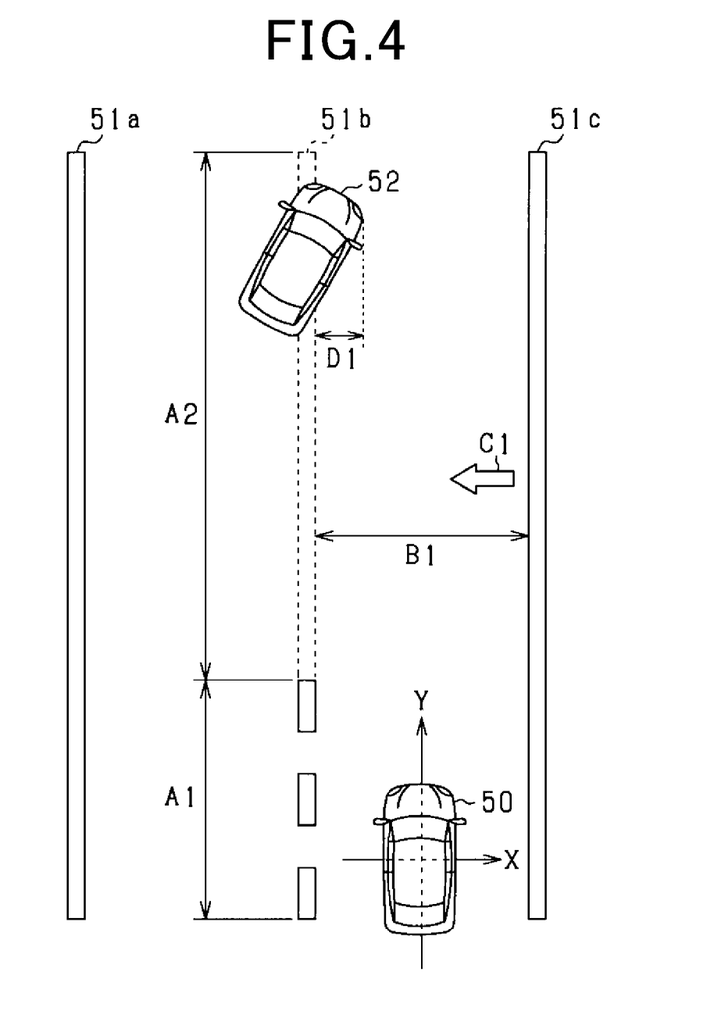
FIG. 4 is a schematic diagram illustrating entry of the vehicle.

Next, when the determination section 33 determines that there is a possibility of departure or entry from or to the own lane, the determination section 33 identifies the first boundary line and determines whether the identified first boundary line has been properly detected. Specifically, the determination section 33 identifies, as the first boundary line, a boundary line of the own lane on the basis of position information on the vehicle with a possibility of departure or entry from or to the own lane or a speed of the vehicle. For example, when the object vehicle is present on a right side of the subject vehicle, the determination section 33 identifies, as the first boundary line, a boundary line on the right side out of the boundary lines of the own lane. On the other hand, when the object vehicle is present on a left side of the subject vehicle, the determination section 33 identifies, as the first boundary line, a boundary line on the left side out of the boundary lines of the own lane. In FIGS. 2 to 4, the object vehicle is present on the left side of the subject vehicle, and thus, out of boundary lines 51b and 51c of the own lane, the boundary line 51b on the left side is identified as the first boundary line. The determination section 33 may identify, as the first boundary line, a boundary line that is one of the boundary lines of the own lane and that the vehicle with a possibility of departure or entry from or to the own lane approaches.

Then, the determination section 33 determines whether the first boundary line has been properly detected over an entire detection range in the direction of travel. A state where the first boundary line has been properly detected indicates, for example, that the boundary line has been detected without being discontinuous in the detection range in the direction of travel (y-axis direction). When edge points of the boundary line have not been detected at predetermined intervals or more, it is determined that the boundary line is discontinuous. In FIGS. 2 to 4, a detected portion A1 of the first boundary line is indicated by a solid line.

As illustrated in FIGS. 2 to 4, in a case where the first boundary line 51b is regularly discontinuous, such as when the first boundary line 51b is actually a dashed line, the first boundary line 51b may be determined not to be discontinuous. In FIGS. 2 to 4, a portion (detected portion A1) of the first boundary line 51b near the subject vehicle is determined to be not discontinuous. Furthermore, when a distance between the boundary lines on the both left and right sides of the own lane is out of a predetermined range expected as a lane width (e.g., when the distance is a width for two lanes or the like), the determination section 33 may determine that the first boundary line has not been properly detected.

When the first boundary line dividing the own lane and the adjacent lane has not been properly detected, lane-to-lane movement of the object vehicle between the own lane and the adjacent lane cannot be appropriately recognized on the basis of the first boundary line. However, it is presumably unlikely that neither of the boundary lines on the both left and right sides of the own lane has been properly detected.

For example, as illustrated in FIG. 2, boundary lines on road edges (outermost boundary lines 51a and 51c out of the boundary lines), which are less likely to be straddled by a vehicle, are less likely to be blurred than the first boundary line 51b. Furthermore, it is unlikely that an adjacent vehicle prevents an image of both of the boundary lines 51b and 51c on the both left and right sides of the own lane from being captured. A lane width (width between the boundary lines) is highly likely to be approximately constant. Thus, the estimation section 34 estimates one of the boundary lines of the own lane on the basis of the other of the boundary lines of the own lane and the lane width. Details of this will be described below.

When the determination section 33 determines that the first boundary line has not been properly detected, the estimation section 34 estimates a position of the first boundary line on the basis of a boundary line (a boundary line on the side opposite to the first boundary line, termed second boundary line hereinafter) that is one of the boundary lines on the both left and right sides of the own lane and is different from the first boundary line, and the lane width of the own lane.

As the lane width, a lane width at a certain position (e.g., a position corresponding to the detected portion A1 properly detected such as a portion around the subject vehicle) in the direction of travel (y-axis direction) is used. In consideration that the lane width is not suddenly changed, a previous lane width (e.g., one cycle before) stored in the storage section 37 may be acquired and used. Alternatively, a lane width as navigation information may be acquired from a navigation system and used.

Specifically, as illustrated in FIG. 2, the estimation section 34 estimates the position of the first boundary line 51b by shifting the second boundary line 51c in parallel by a lane width B1 in the width direction (direction orthogonal to the second boundary line 51c) of the own lane. A direction in which the second boundary line 51c is shifted is a direction (direction indicated by arrow C1 in FIG. 2) toward the subject vehicle in the width direction of the own lane. The first boundary line 51b is estimated so that a subject vehicle 50 is located between the first boundary line 51b and the second boundary line 51c. In FIG. 2, the estimated first boundary line 51b is indicated by a dashed line.

When estimating the first boundary line 51b, the estimation section 34 estimates only an undetected portion A2 of the first boundary line 51b on the basis of the second boundary line 51c and the lane width B1, and interpolates the undetected portion A2 on the basis of the estimation. Specifically, the detected portion A1 of the first boundary line 51b is used as it is. When the boundary lines 51b and 51c on the both left and right sides of the own lane have not been detected at a certain position in the direction of travel (y-axis direction), no estimation is performed at least at the position.

On the basis of the first boundary line that has been properly detected or the first boundary line in which the undetected portion has been interpolated by the estimation section 34, the recognition section 35 recognizes lane-to-lane movement of the object vehicle between the own lane and the adjacent lane. The recognition of lane-to-lane movement will be described in detail below.

The recognition section 35 recognizes, for each detected vehicle, whether lane-to-lane movement is performed. First, recognition of departure regarding whether the object vehicle will depart from the own lane will be described.

The recognition section 35 determines whether the object vehicle to be recognized is a vehicle serving as a target for the vehicle following control. The vehicle serving as a target is a vehicle to which an inter-vehicle distance from the subject vehicle is shortest among preceding vehicles in the own lane. When the ACC function is started, the vehicle serving as a target is determined on the basis of the boundary line and position information on the vehicles. After the vehicle serving as a target is determined, the recognition section 35 determines whether the object vehicle to be recognized is the vehicle serving as a target, by predicting a position of the vehicle serving as a target on the basis of an inter-vehicle distance, an azimuth, and a relative speed regarding the vehicle, and the like. The determination may be made by using characteristics of the vehicle such as a vehicle width and a vehicle shape.

When the recognition section 35 determines that the object vehicle to be recognized is the vehicle serving as a target, the recognition section 35 calculates a linear dimension of the object vehicle toward an inside of the own lane with respect to the first boundary line (relative to the first boundary line) in the width direction of the own lane. Specifically, as illustrated in FIG. 2, on the basis of a position of the first boundary line 51b in the width direction of the own lane and a farthest position of an object vehicle 52 from the first boundary line 51b, the recognition section 35 calculates a linear dimension D1 of the object vehicle 52 toward the inside of the own lane with respect to the first boundary line 51b.

The farthest position of the object vehicle 52 from the first boundary line 51b is a closest position of the object vehicle 52 to the inside of the own lane. For example, as illustrated in FIG. 2, when the object vehicle 52 moves from a right lane (own lane) to a left lane (adjacent lane), the farthest position of the object vehicle 52 from the first boundary line 51b is a rightmost position (position near a right tail lamp in FIG. 2) of the object vehicle 52 in the width direction of the own lane. The farthest position of the object vehicle 52 from the first boundary line 51b can be identified on the basis of the image information and the radar information.

On the other hand, the position of the first boundary line 51b is a position at a rearmost portion (portion closest to the subject vehicle) of the object vehicle 52 to be recognized in the direction of travel. For example, in FIG. 2, the position of the first boundary line 51b is a position near a left tail lamp of the object vehicle 52. The rearmost portion of the object vehicle 52 is used as the position of the first boundary line 51b, but the position of the first boundary line 51b may be changed to any position. For example, the position of the first boundary line 51b may be a center position of the object vehicle 52 or a position at which the object vehicle 52 straddles the first boundary line 51b. Alternatively, the position of the first boundary line 51b may be a position distant from the object vehicle 52 by a predetermined distance in the direction of travel (y-axis direction).

In this case, when the position of the first boundary line at the rearmost portion of the object vehicle 52 to be recognized has not been properly detected, the recognition section 35 calculates the linear dimension D1 on the basis of a position of the first boundary line 51b estimated by the estimation section 34.

Next, the recognition section 35 recognizes whether the vehicle will depart from the own lane, by comparing, with a departure threshold, the linear dimension of the object vehicle toward the inside of the own lane with respect to the first boundary line. Specifically, when the linear dimension of the object vehicle toward the inside of the own lane is the departure threshold or less, the recognition section 35 recognizes that the object vehicle will depart from the own lane. As the departure threshold, a predetermined value, for example, 1.4 m or the like is set in consideration of an inter-vehicle distance, a vehicle speed, and the like.

When the lane-to-lane movement is recognized on the basis of the estimated first boundary line, accuracy is reduced, as compared with when the lane-to-lane movement is recognized on the basis of the properly detected first boundary line. Specifically, the estimated first boundary line may deviate in the width direction from the original first boundary line. Accordingly, even when no lane-to-lane movement is performed, it may be recognized that lane-to-lane movement is performed. Thus, when the recognition section 35 recognizes departure of the object vehicle, the recognition section 35 sets the departure threshold according to whether the first boundary line has been estimated. That is, in a case where the first boundary line has been estimated, the departure threshold is set to a different value from a value set in a case where the first boundary line has not been estimated. Specifically, in the case where the first boundary line has been estimated, a small value (e.g., 1.3 m) is set as the departure threshold, as compared with the case where the first boundary line has not been estimated. Thus, when the lane-to-lane movement is recognized on the basis of the estimated first boundary line, the recognition section 35 is less likely to recognize that the object vehicle will depart from the own lane, as compared with when the lane-to-lane movement is recognized on the basis of the properly detected first boundary line.

Similarly, as illustrated in FIG. 3, in a case where the undetected portion A2 is long (see FIG. 3 (A)), the inter-vehicle movement is more likely to be erroneously recognized, as compared with a case where the undetected portion A2 is short (see FIG. 3 (B)). This is because, although the first boundary line 51b is estimated on the basis of the second boundary line 51c and the lane width B1 assuming that the lane width B1 is constant, in the case where the undetected portion A2 is long, the lane width B1 is less likely to be constant. Specifically, in the case where the undetected portion A2 is long, the estimated first boundary line 51b may deviate in the width direction of the own lane from the original first boundary line. Accordingly, even when no inter-vehicle movement is performed, it may be recognized that the inter-vehicle movement is performed. Thus, the recognition section 35 sets the departure threshold on the basis of a length of the portion interpolated on the basis of the estimation. Specifically, in a case where the interpolated portion (undetected portion A2) in the direction of travel is longer than a predetermined value (e.g., 10 m), a small value (e.g., 1.25 m) is set as the departure threshold, as compared with a case where the interpolated portion is shorter than the predetermined value. Thus, in the case where the undetected portion A2 is long (see FIG. 3 (A)), the recognition section 35 is less likely to recognize that the object vehicle will depart from the own lane, as compared with the case where the undetected portion A2 is short (see FIG. 3 (B)).

Then, when the recognition section 35 recognizes that the object vehicle to be recognized will depart from the own lane, the inter-vehicle control ECU 13 changes the vehicle serving as a target. Specifically, the inter-vehicle control ECU 13 determines, as a new target, a vehicle which is preceding the object vehicle to be recognized and to which an inter-vehicle distance from the subject vehicle is shortest among vehicles located in the own lane. When the vehicle that is preceding the object vehicle to be recognized and is located in the own lane is not present, the inter-vehicle control ECU 13 changes the vehicle serving as a target so that no vehicle serves as a target.

Next, recognition of entry to the own lane will be described. When the recognition section 35 determines that the object vehicle to be recognized is not the vehicle serving as a target, the recognition section 35 determines, on the basis of position information on the object vehicle to be recognized and position information on the vehicle serving as a target, whether the object vehicle to be recognized is present at a position closer to the subject vehicle than the vehicle serving as a target is. Specifically, the recognition section 35 determines whether the object vehicle to be recognized is closer to the subject vehicle than the vehicle serving as a target is, by calculating a distance from the subject vehicle to each of the object vehicles in the direction of travel (y-axis direction) on the basis of an inter-vehicle distance and an azimuth regarding the object vehicles, and comparing the calculated distances.

When the recognition section 35 determines that the object vehicle to be recognized is closer to the subject vehicle than the vehicle serving as a target is, the recognition section 35 performs the recognition of entry to the own lane. In the recognition of entry, the recognition section 35 first calculates a linear dimension of the object vehicle toward the inside of the own lane with respect to the first boundary line in the width direction of the own lane. Specifically, as described above, as illustrated in FIG. 4, on the basis of a position of the first boundary line 51b in the width direction of the own lane and a farthest position of the object vehicle 52 from the first boundary line 51b, the recognition section 35 calculates a linear dimension D1 of the object vehicle 52 toward the inside of the own lane with respect to the first boundary line 51b.

For example, as illustrated in FIG. 4, when the object vehicle 52 moves from a left lane (adjacent lane) to a right lane (own lane), the farthest position of the object vehicle from the first boundary line 51b is a rightmost position (position near a right headlamp in FIG. 4) of the object vehicle 52 in the width direction. The farthest position of the object vehicle 52 from the first boundary line 51b can be identified on the basis of the image information and the radar information. On the other hand, as with the case of the recognition of departure, the position of the first boundary line 51b is a position at the rearmost portion of the object vehicle 52 in the direction of travel (y-axis direction). For example, in FIG. 4, the position of the first boundary line 51b is a position of the first boundary line 51b near a right tail lamp of the object vehicle 52.

In this case, when the position of the first boundary line 51b at the rearmost portion of the object vehicle 52 to be recognized has not been properly detected, the recognition section 35 calculates the linear dimension D1 on the basis of a position of the first boundary line 51b estimated by the estimation section 34.

Next, the recognition section 35 recognizes whether the vehicle will enter the own lane, by comparing, with an entry threshold, the linear dimension of the object vehicle toward the inside of the own lane. Specifically, when the linear dimension of the object vehicle toward the inside of the own lane is the entry threshold or more, the recognition section 35 recognizes that the object vehicle will enter the own lane. As the entry threshold, a predetermined value, for example, 0.3 m or the like is set in consideration of an inter-vehicle distance, a vehicle speed, and the like.

When the recognition section 35 recognizes entry of the object vehicle, as with the case of the recognition of departure, the recognition section 35 sets the entry threshold according to whether the first boundary line has been estimated. Specifically, in the case where the first boundary line has been estimated, a large value (e.g., 0.4 m) is set as the entry threshold, as compared with the case where the first boundary line has not been estimated. Thus, in the case where the first boundary line has been estimated, the recognition section 35 is less likely to recognize that the object vehicle will enter the own lane, as compared with the case where the first boundary line has not been estimated.

Similarly, the recognition section 35 sets the entry threshold on the basis of a length of the portion interpolated on the basis of the estimation. Specifically, in the case where the interpolated portion (undetected portion) in the direction of travel is longer than a predetermined value (e.g., 10 m), a large value (e.g., 0.45 m) is set as the entry threshold, as compared with the case where the interpolated portion is shorter than the predetermined value. Thus, in the case where the interpolated portion (undetected portion) is longer than the predetermined value (e.g., 10 m), the recognition section 35 is less likely to recognize that the object vehicle will enter the own lane, as compared with the case where the interpolated portion is shorter than the predetermined value.

Then, when the recognition section 35 recognizes that the object vehicle to be recognized will enter the own lane, the inter-vehicle control ECU 13 changes the vehicle serving as a target. Specifically, the inter-vehicle control ECU 13 determines, as a new target, the object vehicle that will enter the own lane.

The vehicle control section 36 determines an acceleration instruction value for the subject vehicle on the basis of information (inter-vehicle distance and relative speed) regarding the object vehicle serving as a target and information (speed, acceleration, and the like) regarding the subject vehicle, and transmits the acceleration instruction value to the engine ECU 14 and the brake ECU 15. In this case, the vehicle control section 36 determines the acceleration instruction value for the subject vehicle so that a distance to the object vehicle serving as a target is a target value for the inter-vehicle distance according to the vehicle speed.

Figure 5:
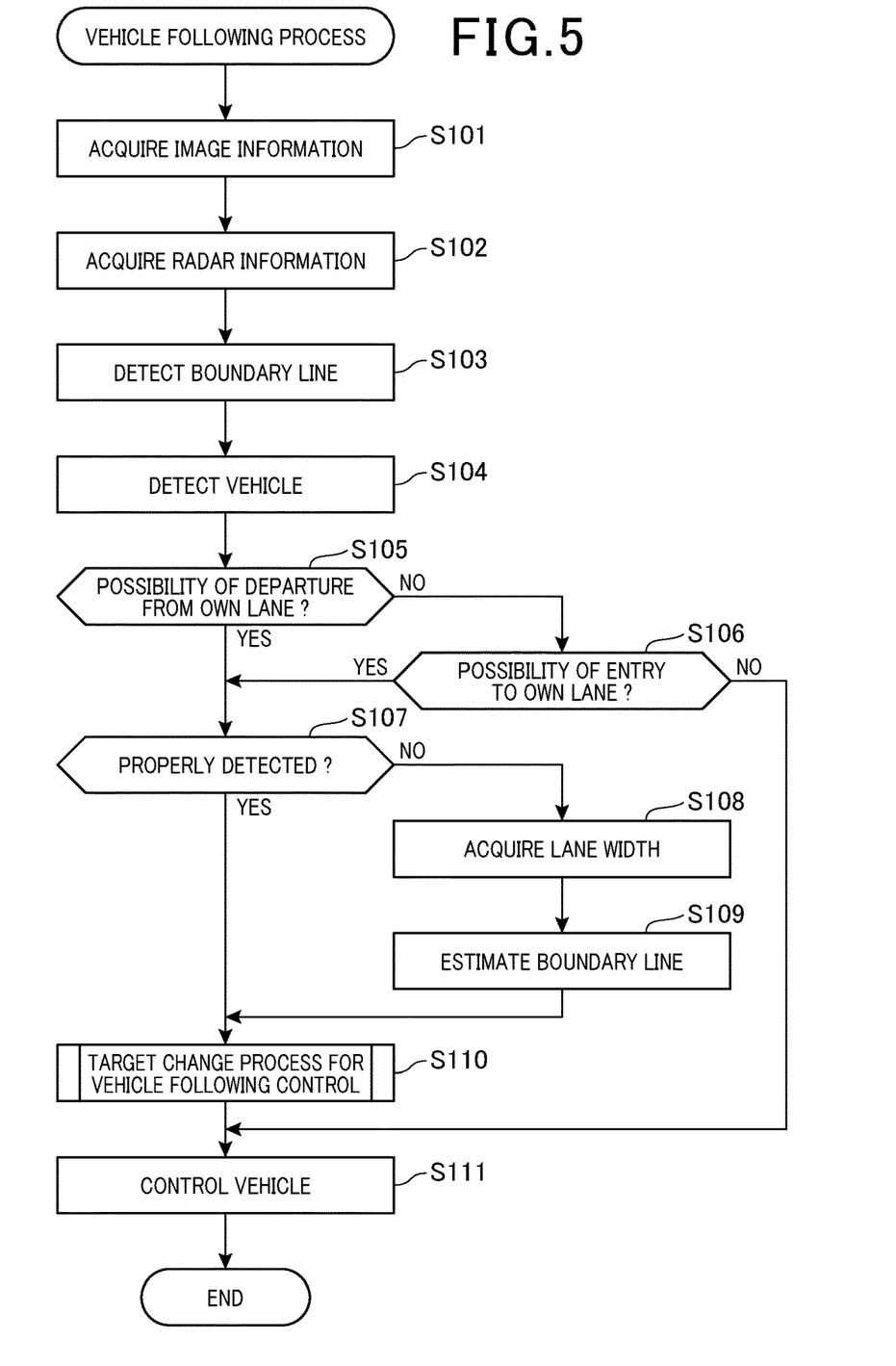
FIG. 5 is a flow chart showing a vehicle following process.

The vehicle following process for causing the subject vehicle to perform following travel will be described below with reference to FIG. 5. The vehicle following process is performed by the inter-vehicle control ECU 13 at predetermined time intervals.

First, the inter-vehicle control ECU 13 acquires image information from the image acquisition device 12 (step S101), and acquires radar information from the radar device 11 (step S102).

Next, on the basis of a captured image included in the image information, the inter-vehicle control ECU 13 extracts edge points and detects a boundary line (step S103). At this point, the inter-vehicle control ECU 13 identifies boundary lines demarcating the own lane. Then, on the basis of the image information and the radar information, the inter-vehicle control ECU 13 detects information regarding each object vehicle (step S104).

Subsequently, the inter-vehicle control ECU 13 determines whether there is a possibility of lane departure of a vehicle (step S105). When the inter-vehicle control ECU 13 determines that there is a possibility of lane departure of one of the detected vehicles, the inter-vehicle control ECU 13 makes an affirmative determination at step S105. When the inter-vehicle control ECU 13 determines that there is no possibility of departure from the own lane (NO at step S105), the inter-vehicle control ECU 13 determines whether there is a possibility of lane entry of a vehicle (step S106). In this case, when the inter-vehicle control ECU 13 determines that there is a possibility of lane entry of one of the detected vehicles, the inter-vehicle control ECU 13 makes an affirmative determination at step S106. When the inter-vehicle control ECU 13 determines that there is a possibility of departure from the own lane (YES at step S105), or when the inter-vehicle control ECU 13 determines that there is a possibility of entry to the own lane (YES at step S106), the inter-vehicle control ECU 13 identifies the first boundary line, and determines whether the identified first boundary line has been properly detected (step S107).

When the inter-vehicle control ECU 13 determines that the first boundary line has not been properly detected (NO at step S107), the inter-vehicle control ECU 13 acquires a lane width of the own lane (step S108). Then, the inter-vehicle control ECU 13 estimates the first boundary line by shifting the second boundary line in parallel by the lane width in the width direction of the own lane (step S109). When estimating the first boundary line, the inter-vehicle control ECU 13 estimates only an undetected portion of the first boundary line on the basis of the second boundary line and the lane width, and interpolates the undetected portion on the basis of the estimation.

When the inter-vehicle control ECU 13 determines that the first boundary line has been properly detected (YES at step S107), or when the inter-vehicle control ECU 13 estimates the first boundary line at step S109, the inter-vehicle control ECU 13 performs a target change process (described later) (step S110). In the target change process at step S110, the inter-vehicle control ECU 13 recognizes lane-to-lane movement of the object vehicle between the own lane in which the subject vehicle is traveling and the adjacent lane. When the first boundary line has not been properly detected, in the target change process, the inter-vehicle control ECU 13 recognizes the lane-to-lane movement on the basis of the first boundary line estimated on the basis of the second boundary line and the lane width, and position information on the object vehicle.

When the inter-vehicle control ECU 13 determines that there is no possibility of entry to the own lane (NO at step S106), or after the target change process at step S110 is performed, the inter-vehicle control ECU 13 determines the acceleration instruction value for the subject vehicle so that the subject vehicle travels following the vehicle serving as a target (step S111). Then, the inter-vehicle control ECU 13 transmits the determined acceleration instruction value to the engine ECU 14 and the brake ECU 15, and ends the vehicle following process. Thus, when the inter-vehicle control ECU 13 performs the vehicle following process, a vehicle recognition method is performed.

Figure 6:
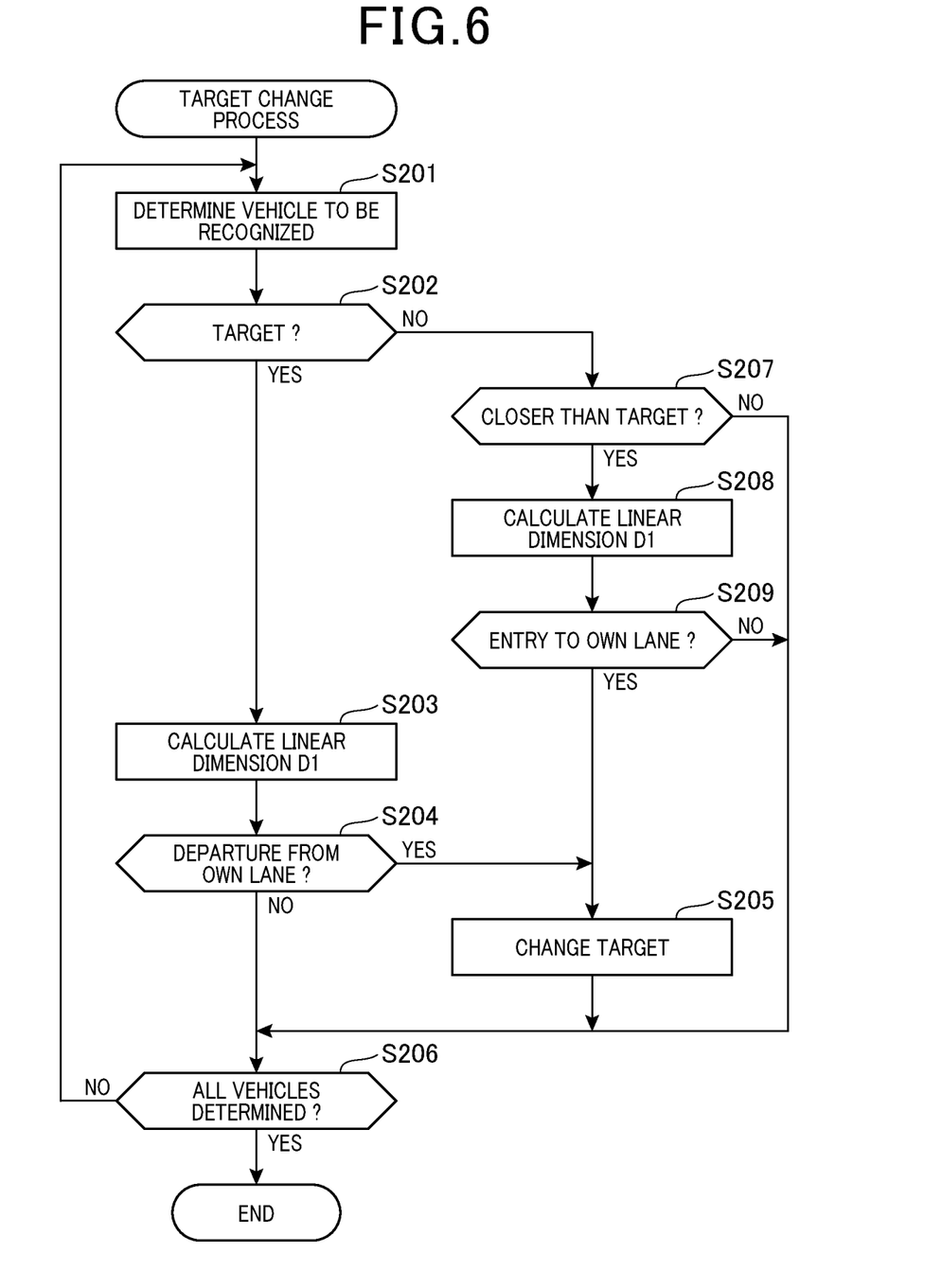
FIG. 6 is a flow chart showing a target change process for vehicle following control.

The target change process at step S110 will be described below with reference to FIG. 6. The inter-vehicle control ECU 13 determines a vehicle to be recognized from the detected object vehicles (step S201).

Next, the inter-vehicle control ECU 13 determines whether the object vehicle to be recognized is a vehicle serving as a target (step S202). When the object vehicle to be recognized is the vehicle serving as a target (YES at step S202), on the basis of a position of the first boundary line and a farthest position of the object vehicle from the first boundary line in the width direction of the own lane, the inter-vehicle control ECU 13 calculates the linear dimension D1 of the object vehicle toward the inside of the own lane with respect to the first boundary line (step S203). Then, on the basis of whether the linear dimension D1 of the object vehicle toward the inside of the own lane is the departure threshold (e.g., 1.4 m) or less, the inter-vehicle control ECU 13 recognizes whether the object vehicle will depart from the own lane (step S204). In the case where the first boundary line has been estimated, a small value (e.g., 1.3 m) is set as the departure threshold, as compared with the case where the first boundary line has not been estimated. Furthermore, in the case where the interpolated portion (undetected portion) in the direction of travel is longer than a predetermined value, a small value (e.g., 1.25 m) is set as the departure threshold, as compared with the case where the interpolated portion is shorter than the predetermined value. In the case where the interpolated portion is shorter than the predetermined value, 1.3 m is set as the departure threshold.

When the linear dimension D1 of the object vehicle toward the inside of the own lane is the departure threshold or less (YES at step S204), the inter-vehicle control ECU 13 recognizes that the object vehicle will depart from the own lane, and the inter-vehicle control ECU 13 changes the vehicle serving as a target (step S205). When the inter-vehicle control ECU 13 recognizes that the object vehicle will depart from the own lane, the inter-vehicle control ECU 13 determines, as a new target, a vehicle which is preceding the object vehicle to be recognized and to which an inter-vehicle distance from the subject vehicle is shortest among vehicles located in the own lane. When the vehicle that is preceding the object vehicle to be recognized and is located in the own lane is not present, the inter-vehicle control ECU 13 changes the vehicle serving as a target so that no vehicle serves as a target.

On the other hand, when the linear dimension D1 of the object vehicle toward the inside of the own lane is not the departure threshold or less (NO at step S204), or when the vehicle serving as a target is changed at step S205, the inter-vehicle control ECU 13 determines whether all the vehicles detected at step S104 have been performed the determination process at step S201 (step S206).

When all the detected vehicles have not been performed the determination process at step S201 (NO at step S206), control proceeds to step S201 and the inter-vehicle control ECU 13 determines a new vehicle to be recognized. In this case, the inter-vehicle control ECU 13 determines the new vehicle to be recognized from vehicles that have not yet been the vehicle to be recognized. On the other hand, when all the detected vehicles have been performed the determination process at step S201 (YES at step S206), the inter-vehicle control ECU 13 ends the following vehicle change process.

When the inter-vehicle control ECU 13 determines that the object vehicle to be recognized is not the vehicle serving as a target (NO at step S202), the inter-vehicle control ECU 13 determines whether the object vehicle to be recognized is located at a position closer to the subject vehicle than the vehicle serving as a target is (step S207). When the inter-vehicle control ECU 13 does not determine that the object vehicle to be recognized is located at the position closer to the subject vehicle than the vehicle serving as a target is (NO at step S207), the object vehicle does not enter the own lane (the target is not changed), and thus control proceeds to step S206 and the inter-vehicle control ECU 13 performs the process at S206.

When the inter-vehicle control ECU 13 determines that the object vehicle to be recognized is located at the position closer to the subject vehicle than the vehicle serving as a target is (YES at step S207), on the basis of a position of the first boundary line and a farthest position of the object vehicle from the first boundary line in the width direction of the own lane, the inter-vehicle control ECU 13 calculates the linear dimension D1 of the object vehicle toward the inside of the own lane with respect to the first boundary line (step S208).

Next, on the basis of whether the linear dimension D1 of the object vehicle toward the inside of the own lane is the entry threshold (e.g., 0.3 m) or more, the inter-vehicle control ECU 13 recognizes whether the object vehicle will enter the own lane (step S209). In the case where the first boundary line has been estimated, a large value (e.g., 0.4 m) is set as the entry threshold, as compared with the case where the first boundary line has not been estimated. Furthermore, in the case where the interpolated portion (undetected portion) in the direction of travel is longer than a predetermined value, a large value (e.g., 0.45 m) is set as the entry threshold, as compared with the case where the interpolated portion is shorter than the predetermined value. In the case where the interpolated portion is shorter than the predetermined value, 0.4 m is set as the entry threshold.

When the linear dimension D1 of the object vehicle toward the inside of the own lane is the entry threshold or more (YES at step S209), the inter-vehicle control ECU 13 recognizes that the object vehicle will enter the own lane, and the inter-vehicle control ECU 13 changes the vehicle serving as a target (step S205). When the inter-vehicle control ECU 13 recognizes that the object vehicle will enter the own lane, the inter-vehicle control ECU 13 changes the vehicle serving as a target so that the object vehicle that will enter the own lane (object vehicle to be recognized) is a new target.

On the other hand, when the linear dimension D1 of the object vehicle toward the inside of the own lane is not the entry threshold or more (NO at step S209), or when the vehicle serving as a target is changed at step S205, control proceeds to step S206 and the inter-vehicle control ECU 13 performs the process at step S206.

With the above configuration, the vehicle control device according to the present embodiment yields effects below.

The first boundary line dividing the own lane and the adjacent lane cannot be properly detected on the basis of the captured image, for example, when some obstacle prevents an image of the first boundary line from being captured or when the first boundary line is blurred. Thus, the inter-vehicle control ECU 13 recognizes that the object vehicle moves between the own lane in which the subject vehicle is traveling and the adjacent lane, on the basis of the second boundary line different from the first boundary line, the lane width between the first boundary line and the second boundary line, and the position information on the object vehicle. Therefore, even when the first boundary line dividing the own lane and the adjacent lane is not properly detected, it is possible to recognize that the object vehicle moves laterally, for example, the object vehicle is changing lanes.

Furthermore, when the first boundary line has been properly detected, the inter-vehicle control ECU 13 recognizes the lane-to-lane movement on the basis of the first boundary line. Accordingly, the lane-to-lane movement can be more accurately recognized than when the lane-to-lane movement is recognized on the basis of the second boundary line and the lane width. On the other hand, when the first boundary line has not been properly detected, the inter-vehicle control ECU 13 estimates the first boundary line on the basis of the second boundary line and the lane width, and recognizes the lane-to-lane movement on the basis of the estimated first boundary line. Thus, the lane-to-lane movement can be recognized similarly to when the first boundary line has been properly detected.

The inter-vehicle control ECU 13 estimates and interpolates only the undetected portion of the first boundary line. Thus, as compared with when the whole first boundary line is estimated, accuracy of the first boundary line can be improved, and accordingly, accuracy of the recognition of the lane-to-lane movement can also be improved.

In the case where the interpolated portion of the first boundary line is long, the lane-to-lane movement may be erroneously recognized. This is because, although the first boundary line is estimated on the basis of the second boundary line and the lane width assuming that the lane width is constant, in the case where the undetected portion is long, the lane width is less likely to be constant. Thus, in consideration of accuracy, the inter-vehicle control ECU 13 sets, on the basis of the length of the interpolated portion, the thresholds (departure threshold and entry threshold) used for the recognition so that the recognition can be appropriately performed.

The possibility that the lane-to-lane movement is erroneously recognized is different between when the lane-to-lane movement is recognized on the basis of the properly detected first boundary line and when the lane-to-lane movement is recognized on the basis of the estimated first boundary line. Specifically, the estimated first boundary line may deviate in the width direction from the actual first boundary line. Accordingly, even when no lane-to-lane movement is performed, it may be recognized that the lane-to-lane movement is performed. Thus, in consideration of accuracy, the inter-vehicle control ECU 13 sets, on the basis of whether the first boundary line has been estimated, the thresholds used for the recognition so that the recognition can be appropriately performed.

Visibility of the boundary lines on the both left and right sides demarcating the own lane is less likely to be blocked by an obstacle or the like. Furthermore, since these boundary lines are the boundary lines closest to the subject vehicle, the boundary lines are more likely to be properly detected. Specifically, even when one of the boundary lines of the own lane has not been properly detected, the other of the boundary lines is highly likely to have been detected. Thus, the inter-vehicle control ECU 13 estimates the first boundary line by using, as the second boundary line, the boundary line that is one of the boundary lines of the own lane and is different from the first boundary line.

Other Embodiments

The present disclosure is not limited to the above embodiment, but may be implemented, for example, as described below. In the following embodiments, the same or equivalent portions are given the same reference numerals, and descriptions of the portions given the same reference numerals are incorporated by reference.

When a curvature of the lane is a predetermined curvature or more, erroneous recognition is highly likely to occur, and thus the recognition of the lane-to-lane movement does not need to be performed.

When the lane-to-lane movement is recognized on the basis of the first boundary line estimated by the estimation section 34, the possibility of erroneous recognition is different depending on an inter-vehicle distance between the subject vehicle and the object vehicle. Specifically, when the inter-vehicle distance is long, erroneous recognition of the lane-to-lane movement is more likely to occur, as compared with when the inter-vehicle distance is short. Thus, when the recognition section 35 recognizes the lane-to-lane movement on the basis of the first boundary line estimated by the estimation section 34, the recognition section 35 may set the thresholds (departure threshold and entry threshold) according to the inter-vehicle distance between the subject vehicle and the object vehicle. This enables the lane-to-lane movement to be appropriately recognized even when the inter-vehicle distance between the subject vehicle and the object vehicle is different.

As illustrated in FIG. 2, out of the boundary lines 51b and 51c of the own lane, the boundary line 51c, which is different from the first boundary line 51b, is used as the second boundary line. However, the boundary line 51a of the adjacent lane (note that the boundary lines 51b and 51c of the own lane are excluded) may be used as the second boundary line.

The recognition section 35 recognizes the lane-to-lane movement by comparing, with the threshold, the linear dimension D1 of the object vehicle toward the inside of the own lane with respect to the first boundary line in the width direction of the own lane. However, the recognition section 35 may recognize the lane-to-lane movement by another method. For example, the recognition section 35 may recognize the lane-to-lane movement when an angle between the first boundary line and a direction of travel of the object vehicle is a predetermined angle or more.

The image acquisition device 12 transmits the captured image as the image information. However, the image acquisition device 12 may include a processing section for processing the captured image, and transmit information on edge points extracted on the basis of the captured image or information on characteristic points identified on the basis of the captured image.

The vehicle detection section 31 may be included in the radar device 11. In this case, the radar device 11 transmits the information regarding the detected object vehicle to the inter-vehicle control ECU 13. Similarly, the boundary line detection section 32 may be included in the image acquisition device 12. In this case, the image acquisition device 12 transmits the position information on the detected boundary line to the inter-vehicle control ECU 13.

The image information is fused (fusion) with the radar information. However, the image information does not need to be fused with the radar information. In this case, for example, position information on the vehicle may be detected on the basis of the radar information. Alternatively, position information on the vehicle may be detected on the basis of the image information.

When the first boundary line has not been properly detected, the first boundary line is estimated. However, the first boundary line does not need to be estimated. In this case, for example, the recognition section 35 may estimate the linear dimension D1 of the object vehicle toward the inside of the own lane with respect to the first boundary line by subtracting a lane width from a distance between the second boundary line and the object vehicle in the width direction of the own lane, and recognize the lane-to-lane movement on the basis of the estimated linear dimension D1. Specifically, the recognition section may recognize the lane-to-lane movement on the basis of the second boundary line which is one of the boundary lines detected by the boundary line detection section and is different from the first boundary line dividing the own lane and the adjacent lane, the lane width between the first boundary line and the second boundary line, and the position information on the object vehicle. Thus, when the second boundary line which is different from the first boundary line has been detected, the lane-to-lane movement of the object vehicle is recognized on the basis of the lane width and the position information on the object vehicle. Accordingly, even in a situation where the first boundary line dividing the own lane and the adjacent lane is not detected, it can be determined whether the object vehicle moves laterally. Furthermore, since the first boundary line is not estimated, processing load can be reduced.

The determination section 33 identifies the first boundary line before determining whether the first boundary line has been properly detected. However, the first boundary line does not need to be identified. Specifically, when one of the boundary lines on the both left and right sides of the own lane has not been properly detected, the inter-vehicle control ECU 13 may estimate, on the basis of the other of the boundary lines, the boundary line that has not been properly detected. In this case, the determination of whether there is a possibility of departure or entry from or to the own lane does not need to be performed.

The estimation section 34 estimates the first boundary line by moving the second boundary line in parallel in the width direction of the own lane (direction orthogonal to the second boundary line). However, the estimation section 34 may estimate the first boundary line by moving the second boundary line in parallel in an axial direction (x-axis direction) of the subject vehicle.

When the first boundary line has not been properly detected, the undetected portion of the first boundary line is estimated. As another example of this, when a position (position near a vehicle with a possibility of departure or entry from or to the own lane) of the first boundary line with respect to which the linear dimension D1 is calculated has not been properly detected, only the position of the first boundary line may be estimated. Specifically, the whole undetected portion A2 does not need to be interpolated. The position of the first boundary line with respect to which the linear dimension D1 is calculated is, for example, a position at the rearmost portion (portion closest to the subject vehicle) of the object vehicle 52 to be recognized in the direction of travel (y-axis direction). Specifically, in FIG. 2, the position of the first boundary line with respect to which the linear dimension D1 is calculated is a position near the left tail lamp of the object vehicle 52.

In the above embodiment, the predetermined threshold is set on the basis of the distance of the interpolated portion (undetected portion A2). However, the predetermined threshold may be set on the basis of a distance from a position of a frontmost end of the detected portion A1 in the direction of travel (y-axis direction) to the position of the first boundary line with respect to which the linear dimension D1 is calculated. Specifically, the predetermined threshold may be set on the basis of a distance L1 in FIG. 2.

In the direction of travel, when the detected portion A1 is shorter than a predetermined value (e.g., 10 m), the threshold may be changed. as compared with when the detected portion A1 is longer than the predetermined value.

The vehicle control device of the above embodiment has the ACC function. However, the vehicle control device does not need to have the ACC function. For example, the vehicle control device may be configured to perform some control (calling attention or the like) on the basis of the recognition of entry or the recognition of departure.

In the above embodiment, when the number of lanes is two, a boundary line in the middle dividing the own lane and the adjacent lane may be identified as the first boundary line. For example, as illustrated in FIG. 2, when the three boundary lines 51a to 51c have been detected, the boundary line 51b in the middle may be identified as the first boundary line 51b. The determination of whether the number of lanes is two can be made on the basis of the number of detected boundary lines, the number of lanes in the previous detection, navigation information from the navigation system, or the like.

In the above embodiment, the lane-to-lane movement is recognized on the basis of the linear dimension D1 of the object vehicle toward the inside of the own lane with respect to the first boundary line in the width direction of the own lane. However, the lane-to-lane movement may be recognized on the basis of another linear dimension. For example, the lane-to-lane movement may be recognized on the basis of a dimension by which the object vehicle deviates from the own lane to the adjacent lane.

The present disclosure has been described on the basis of the embodiments, but it is understood that the present disclosure is not limited to the embodiments or the structures. The present disclosure includes various modified examples and modifications within an equivalent range. In addition, a category or range of thought of the present disclosure includes various combinations or forms and other combinations or forms including only one element, one or more elements, or one or less elements of those.

The invention claimed is:

1. A vehicle recognition device comprising:
an acquisition section that acquires image information based on an image captured by a vehicle-mounted camera;
a boundary line detection section that detects, on the basis of the image information, a first boundary line and a second boundary line on both left and right sides demarcating an own lane in which a subject vehicle is traveling;
a determination section that determines whether the first boundary line has been properly detected by the boundary line detection section in response to determining that edge points of the first boundary line have been detected from the acquired image information at pre-determined intervals or more;
an estimation section that, in response to determining that the first boundary line has not been properly detected, estimates the first boundary line which has not been properly detected, on the basis of the second boundary line and a lane width between the first boundary line and the second boundary line;
a vehicle detection section that detects position information on an object vehicle; and
a recognition section that recognizes lane-to-lane movement of the object vehicle between the own lane in which the subject vehicle is traveling and an adjacent lane, wherein:
in response to determining that the first boundary line has been properly detected, the recognition section recognizes the lane-to-lane movement on the basis of the detected first boundary line and the position information on the object vehicle;
in response to determining that the first boundary line has not been properly detected, the recognition section recognizes the lane-to-lane movement on the basis of the estimated first boundary line and the position information on the object vehicle;
the recognition section recognizes the lane-to-lane movement by comparing, with a predetermined threshold, a linear dimension of the object vehicle toward an inside of the own lane with respect to the first boundary line in a width direction of the lane; and
the recognition section sets the threshold on the basis of whether the first boundary line has been estimated by the estimation section.

2. The vehicle recognition device according to claim 1, wherein:
the estimation section estimates an undetected portion of the first boundary line on the basis of the second boundary line and the lane width, and interpolates the undetected portion on the basis of the estimation, the undetected portion being a portion of the first boundary line that has not been properly detected.

3. The vehicle recognition device according to claim 1, wherein:

the recognition section recognizes the lane-to-lane movement by comparing, with a predetermined threshold, a linear dimension of the object vehicle toward an inside of the own lane with respect to the first boundary line in a width direction of the lane; and
when the recognition section recognizes the lane-to-lane movement on the basis of the first boundary line estimated by the estimation section, the recognition section sets the threshold on the basis of an inter-vehicle distance between the subject vehicle and the object vehicle.

4. A vehicle recognition method comprising:
a step of acquiring image information based on an image captured by a vehicle-mounted camera;
a step of detecting, on the basis of the image information, a first boundary line and a second boundary line on both left and right sides demarcating an own lane in which a subject vehicle is traveling;
a step of determining whether the first boundary line has been properly detected in response to determining that edge points of the first boundary line have been detected from the acquired image information at pre-determined intervals or more;
a step of estimating the first boundary line which has not been properly detected, in response to determining that the first boundary line has not been properly detected, on the basis of the second boundary line and a lane width between the first boundary line and the second boundary line;
a step of detecting position information on an object vehicle; and
a step of recognizing lane-to-lane movement of the object vehicle between the own lane in which the subject vehicle is traveling and an adjacent lane, wherein:
in response to determining that the first boundary line has been properly detected, the step of recognizing recognizes the lane-to-lane movement on the basis of the detected first boundary line and the position information on the object vehicle; and
in response to determining that the first boundary line has not been properly detected, the step of recognizing recognizes the lane-to-lane movement on the basis of the estimated first boundary line and the position information on the object vehicle;
the step of recognizing recognizes the lane-to-lane movement by comparing, with a predetermined threshold, a linear dimension of the object vehicle toward an inside of the own lane with respect to the first boundary line in a width direction of the lane; and
the step of recognizing sets the threshold on the basis of whether the first boundary line has been estimated by the step of estimating.

5. A vehicle recognition device comprising:
an acquisition section that acquires image information based on an image captured by a vehicle-mounted camera;
a boundary line detection section that detects, on the basis of the image information, a first boundary line and a second boundary line on both left and right sides demarcating an own lane in which a subject vehicle is traveling;
a determination section that determines whether the first boundary line has been properly detected by the boundary line detection section in response to determining that edge points of the first boundary line have been detected from the acquired image information at pre-determined intervals or more;

an estimation section that, in response to determining that the first boundary line has not been properly detected, estimates the first boundary line which has not been properly detected, on the basis of the second boundary line and a lane width between the first boundary line and the second boundary line;

a vehicle detection section that detects position information on an object vehicle; and a recognition section that recognizes lane-to-lane movement of the object vehicle between the own lane in which the subject vehicle is traveling and an adjacent lane, wherein:

in response to determining that the first boundary line has been properly detected, the recognition section recognizes the lane-to-lane movement on the basis of the detected first boundary line and the position information on the object vehicle; and in response to determining that the first boundary line has not been properly detected, the recognition section recognizes the lane-to-lane movement on the basis of the estimated first boundary line and the position information on the object vehicle;

wherein the estimation section estimates an undetected portion of the first boundary line on the basis of the second boundary line and the lane width, and interpolates the undetected portion on the basis of the estimation, the undetected portion being a portion of the first boundary line that has not been properly detected;

the recognition section recognizes the lane-to-lane movement by comparing, with a predetermined threshold, a linear dimension of the object vehicle toward an inside of the own lane with respect to the first boundary line in a width direction of the lane; and for a state in which the undetected portion of the first boundary line is interpolated by the estimation section, the recognition section sets the threshold on the basis of a length of the portion interpolated on the basis of the estimation.

6. A vehicle recognition device comprising:

an acquisition section that acquires image information based on an image captured by a vehicle-mounted camera;

a boundary line detection section that detects, on the basis of the image information, a first boundary line and a second boundary line on both left and right sides demarcating an own lane in which a subject vehicle is traveling;

a determination section that determines whether the first boundary line has been properly detected by the boundary line detection section in response to determining that edge points of the first boundary line have been detected from the acquired image information at predetermined intervals or more;

an estimation section that, in response to determining that the first boundary line has not been properly detected, estimates the first boundary line which has not been properly detected, on the basis of the second boundary line and a lane width between the first boundary line and the second boundary line;

a vehicle detection section that detects position information on an object vehicle; and a recognition section that recognizes lane-to-lane movement of the object vehicle between the own lane in which the subject vehicle is traveling and an adjacent lane, wherein:

in response to determining that the first boundary line has been properly detected, the recognition section recognizes the lane-to-lane movement on the basis of the detected first boundary line and the position information on the object vehicle;

in response to determining that the first boundary line has not been properly detected, the recognition section recognizes the lane-to-lane movement on the basis of the estimated first boundary line and the position information on the object vehicle;

the recognition section recognizes the lane-to-lane movement by comparing, with a predetermined threshold, a linear dimension of the object vehicle toward an inside of the own lane with respect to the first boundary line in a width direction of the lane; and when the recognition section recognizes the lane-to-lane movement on the basis of the first boundary line estimated by the estimation section, the recognition section sets the threshold on the basis of an inter-vehicle distance between the subject vehicle and the object vehicle.

* * * * *